United States Patent
Bernier

[11] Patent Number: 6,119,788
[45] Date of Patent: Sep. 19, 2000

[54] FOLDABLE AGRICULTURAL ROLLER

[76] Inventor: André Bernier, 321, Rang 2 & 3 Ouest, Les Hauteurs, Comté Rimouski, Québec, Canada, G0K 1C0

[21] Appl. No.: 09/307,954

[22] Filed: May 10, 1999

[51] Int. Cl.⁷ ..................................................... A01B 35/16
[52] U.S. Cl. ............................................ 172/311; 172/536
[58] Field of Search .................................... 172/310, 311, 172/149, 150, 158, 170, 172, 184, 187, 456, 536, 537; 404/123, 126, 132, 122

[56] References Cited

U.S. PATENT DOCUMENTS

| | | |
|---|---|---|
| 62,822 | 3/1867 | Crowe . |
| 96,513 | 11/1869 | Uehling . |
| 182,044 | 9/1876 | Ufford . |
| 386,220 | 7/1888 | Riebold . |
| 1,375,425 | 4/1921 | Smith ...................................... 172/184 |
| 1,419,722 | 6/1922 | Dittmar ............................... 172/536 X |
| 1,611,358 | 12/1926 | Miller .................................. 172/184 X |
| 2,079,249 | 5/1937 | Galati et al. ......................... 172/184 X |
| 2,245,865 | 6/1941 | Le Tourneau ................................ 55/47 |
| 2,750,724 | 6/1956 | Stephenson ................................ 55/93 |
| 2,751,205 | 6/1956 | Petersen ............................... 172/184 X |
| 3,339,643 | 9/1967 | Scarborough ........................... 172/184 |
| 3,810,660 | 5/1974 | Peterson .................................. 280/411 |
| 4,168,750 | 9/1979 | Combs ..................................... 172/311 |
| 4,249,613 | 2/1981 | Scribner ............................... 172/184 X |
| 4,415,043 | 11/1983 | Hadler et al. ............................ 172/776 |
| 4,479,554 | 10/1984 | Kueker ................................... 172/311 |
| 4,871,030 | 10/1989 | Kruse ..................................... 172/397 |
| 4,893,682 | 1/1990 | Smallacombe .......................... 172/311 |
| 4,896,732 | 1/1990 | Stark ....................................... 172/311 |

FOREIGN PATENT DOCUMENTS 1281229  3/1991  Canada .

*Primary Examiner*—Christopher J. Novosad
*Attorney, Agent, or Firm*—Mario D. Theriault

[57] ABSTRACT

The agricultural roller has three rolls mounted in a triangular overlapping operable configuration. The wing rolls are movable about a pair of spaced-apart transversal articulations between the wing roll frameworks and a central framework enclosing the central roll. The transversal articulations are positioned near a respective end of the central roll such that adjacent roll ends move up and down in unison. The central framework is also movable about a longitudinal articulation across the rear end of a trailer frame. The diameter of the central roll is larger than the diameter of wheels on the trailer frame such that the wheels are raisable off the ground when the rolls are deployed in an operable mode. In a towable configuration, the central roll is moved above the trailer frame and the wing rolls are moved above the central roll with their respective axes aligned forwardly.

5 Claims, 6 Drawing Sheets

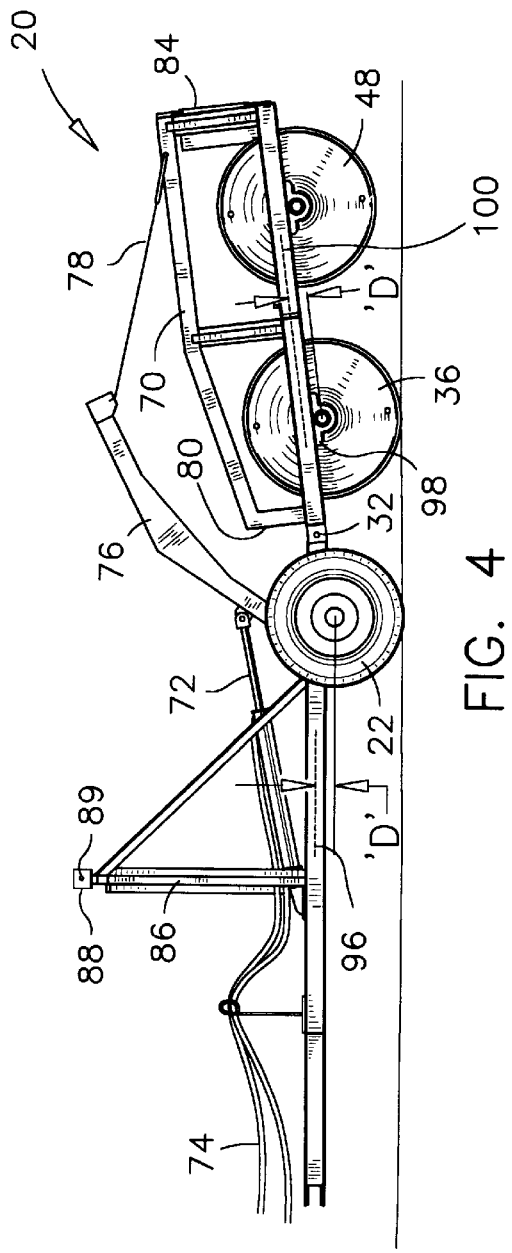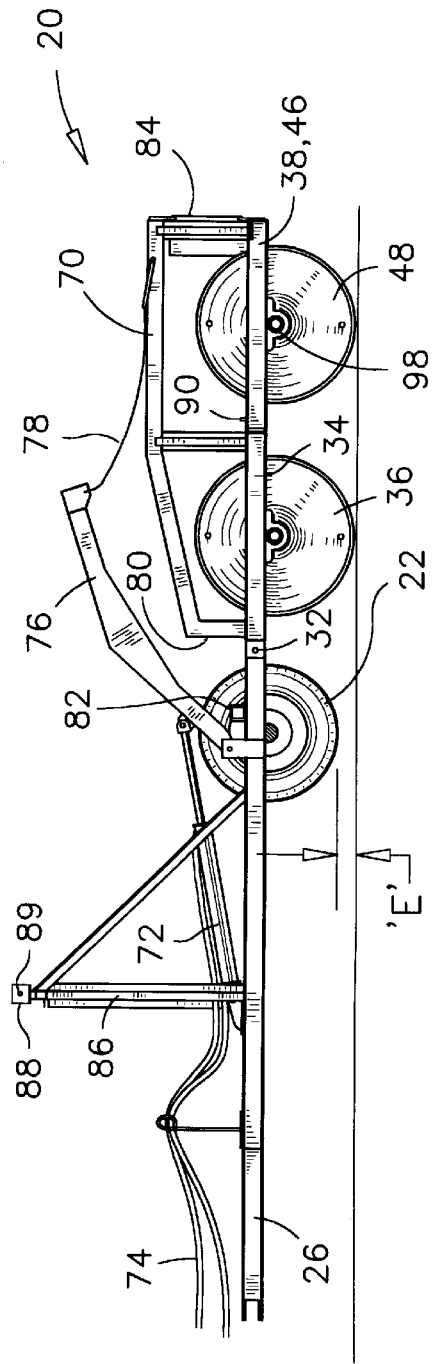

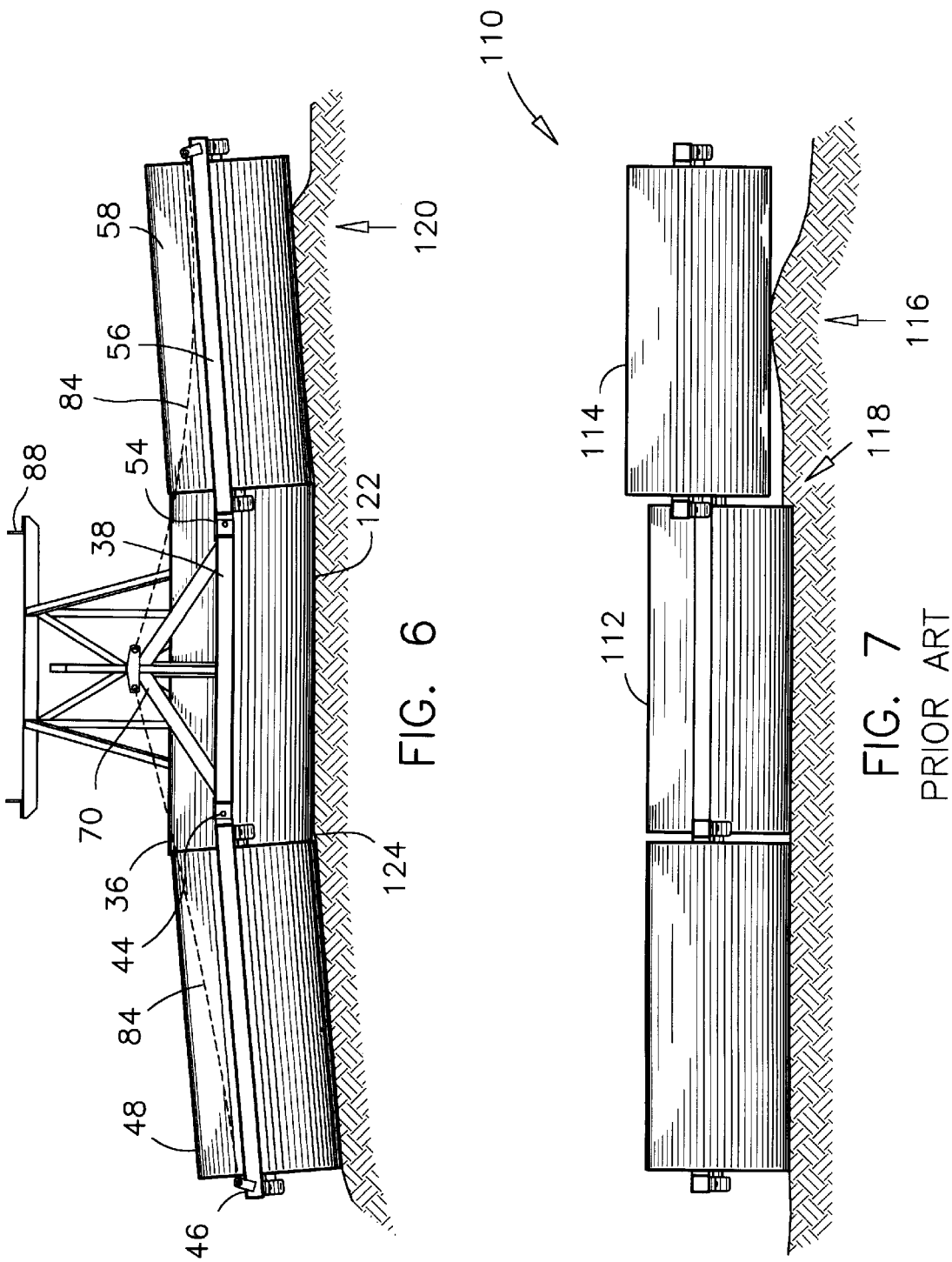

FOLDABLE AGRICULTURAL ROLLER

FIELD OF THE INVENTION

This invention pertains to agricultural rollers, and more particularly, it pertains to agricultural roller assemblies having a triangular deployed formation and a foldable transportable configuration.

BACKGROUND OF THE INVENTION

Agricultural roller assemblies are used to level the ground after sowing cereal plants and hay for examples. A rolled and smoothed soil surface prevents equipment damage at the harvest time and allows for a shorter cut of the harvested plants.

It is believed that among the preferred requirements of cereal growers relative to agricultural roller assemblies, commonly referred to as rollers or land rollers, the prevailing characteristic is that a roller assembly must have a forwardly-pointing-triangular deployed arrangement. This type of configuration is preferred by growers for being easier to pull on hilly grounds and for being easier to turn around at the end of a field. This arrangement is also appreciated for causing minimum scraping of the soil and associated damage to a sown area when turning.

Examples of prior art roller assemblies having three rolls arranged in a triangular formation are illustrated in the following documents:

U.S. Pat. No. 62,822, issued on Mar. 12, 1867 to H. R. Crowe;

U.S. Pat. No. 96,513, issued on Nov. 2, 1869 to E. A. Uehling;

U.S. Pat. No. 182,044, issued on Sep. 12, 1876 to A. H. Ufford;

U.S. Pat. No. 386,220, issued on Jul. 17, 1888 to J. Riebold.

A further preferred requirement for an agricultural roller assembly is believed to be that the machine should be foldable in a compact arrangement and be transportable on wheels from one field to another. In that respect, examples of prior art land rollers capable of being folded in a roadworthy configuration are:

U.S. Pat. No. 4,896,732 issued on Jan. 30, 1990 to C. K. G. Stark;

CA Patent 1,281,229 issued on Mar. 12, 1991 to H. C. Hadley et al.

The machines illustrated and described in these latter-mentioned documents are articulated hydraulically and the folding and unfolding thereof require the movement of the tractor to drag the wing rollers in position for transport or for rolling. The locking of the wing rolls in both positions appears to be effected with pins and shackles.

In a preferred land roller for smoothing agricultural lands, it is also believed that the machine should have as much transversal flexibility as possible to allow each roll to travel over irregularities of the soil without causing undue stresses to the machine's parts. It is also preferable that the adjacent roll ends share a common transversal articulated support such that the adjacent roll ends remain on a same horizontal plane or move in unison when either rolls encounters a clod, a mound or a hollow for example. This characteristic ensures smooth transition surfaces between adjacent rolls. This particular feature is partly illustrated in U.S. Pat. No. 2,245,865 issued on Jun. 17, 1941 to R. G. LeTourneau.

Another preferred requirement for land rollers is believed to be that the wing rolls should overlap the path of the leading roll for providing a smooth soil surface free of transition ridges. This characteristic was present in the older models of land rollers such as some of those firstly mentioned above, but was later abandoned for being impracticable on conventional foldable rollers and in the latter-mentioned flexible structure of the prior art.

Although the agricultural land rollers of the prior art deserve undeniable merits, there is no known machine that combines all the above-mentioned preferred requirements. The agricultural rollers of the prior art are believed to be deficient at least one of the above preferred features, and it is this reason basically that has contributed to the development of a market demand for a better land roller capable of smoothing a field without leaving transition ridge, and capable of being easily foldable for transport on public roads.

SUMMARY OF THE INVENTION

The present invention reduces the difficulties and disadvantages of the prior art equipment by providing an agricultural roller which combines all of the preferred requirements of cereal growers. The machine according to the present invention has a triangular formation, its wing rolls overlap the path of the central roll, each wing roll's inside end shares a common articulated support with the adjacent end of the central roll, and the machine is foldable in a compact arrangement for transport on public roads. Moreover, the land roller according to the present invention is mechanically simple, rugged and relatively easy to manufacture. The machine is operable by a simple hydraulic cylinder and is foldable by one operator without moving the tractor.

In a first aspect of the present invention, the agricultural roller has a central rectangular framework with a planar outline, hereinafter referred to as the median plane, and a forward direction. A central roll is rotatively mounted inside the central framework and is oriented for rotation toward the forward direction. The central roll has a nominal length, a right end, a left end and a first rolling path projection.

An intermediate structure is rigidly connected to and extends rearward from the central framework in alignment with the median plane. The intermediate structure has spaced-apart right and left sides relative to the forward direction.

A right wing framework has right hinge members which are movably connected to the right side of the intermediate structure and define a right axis of articulation between the right wing framework and the intermediate structure. The right axis of articulation is aligned with the median plane, is parallel with the forward direction, and is positioned near the right end of the central roll.

A right wing roll is rotatively mounted in the right wing framework and is oriented for rotation toward the forward direction. The right wing roll has a second rolling path projection overlapping the first rolling path projection by a first extent.

A left wing framework has left hinge members which are movably connected to the left side of the intermediate structure and define a left axis of articulation between the left wing framework and the intermediate structure. The left axis of articulation is aligned with the median plane, is parallel with the forward direction, and is positioned near the left end of the central roll.

A left wing roll is rotatively mounted in the left wing framework and is oriented for rotation toward the forward direction. The left wing roll has a third rolling path projection overlapping the first rolling path projection by a second extent.

A major advantage of the agricultural roller of the present invention is that in operation, when one of the right and left wing rolls are moved about one of the right and left axes of articulation relative to the central roll, adjacent ends of the central roll and one of the wing rolls are movable in unison and are maintainable at proximity of one another and substantially at a same level for minimizing ridges in an agricultural land.

In accordance with another feature of the present invention, the central roll and the wing rolls define a triangular formation pointing in the forward direction. The agricultural roller assembly is thereby easier to pull on hilly grounds and easier to turn around obstacles.

In yet another feature of the present invention, the wing rolls have openings therein for introducing liquid ballast inside the rolls. In use, the weight of each wing rolls is increasable to equate the weight of the central roll plus its associated support and hitch structure, such that a ground pressure is similar on all three rolls.

In accordance to yet another aspect of the present invention, there is provided an agricultural roller for working agricultural lands and comprising a trailer frame having a forward end, a rear end, a hitch mounted to the forward end and a pair of spaced apart wheels mounted near the rear end. The trailer frame defines a horizontal plane and the wheels have a first diameter and are mounted under the trailer frame with a common wheel axis thereof at a nominal distance below the horizontal plane.

There is also provided a first framework having first hinge members connected to the rear end of the trailer frame and defining a first axis of articulation between the trailer frame and the first framework. The first framework has a median plane there through and the first axis of articulation is oriented transversally relative to the forward direction.

A central roll is rotatively mounted in the first framework. The central roll has a second diameter and is oriented for rotation toward the forward direction. The central roll is mounted to the first framework with a rolling axis thereof at the nominal distance below or rearward the median plane. The second diameter is larger than the first diameter.

An intermediate structure is rigidly connected to the first framework and extends rearward the first framework within the median plane.

A pair of wing roll support structures is connected to the intermediate structure and a pair of wing rolls is rotatively mounted in the wing roll support structures. These wing rolls are positional for rotation toward the forward direction. In use, the wing rolls define with the central roll a triangular formation pointing in the forward direction.

This aspect of the invention is particularly advantageous in that when the first framework is articulated about the first axis of articulation, and is caused to be deployed and aligned with the trailer frame, the wheels of the trailer frame are raisable off the ground for operating the agricultural roller.

In yet a further feature of the present invention, the intermediate structure of the agricultural roller has right and left sides relative to the forward direction. The right wing framework has right hinge member movably connected to the right side of the intermediate structure and defining a right axis of articulation between the right wing framework and the intermediate structure. The right axis of articulation is aligned within the median plane at right angle with the first axis of articulation, and is positioned near the right end of the central roll. The left wing framework has a left hinge member movably connected to the left side of the intermediate structure and defines a left axis of articulation between the left wing framework and the intermediate structure. The left axis of articulation is aligned within the median plane at right angle with the first axis of articulation and is positioned near the left end of the central roll.

A right wing roll is rotatively mounted in the right wing framework, and a left wing roll is rotatively mounted in the left wing framework. The right and left wing rolls are positional for rotation in the forward direction.

A bridge structure is connected to and extends over the first framework and the intermediate structure when the agricultural roller is in an operational mode. There is also provided a set of chains connected to the bridge structure and to the right and left wing frameworks for selectively retaining the right and left wing frameworks in the median plane of the first framework. A lever is mounted to the trailer frame and a tie member is connected to the bridge structure and to the trailer frame for selectively tilting the first framework and the intermediate structure about the first axis of articulation, and for moving the first framework and the intermediate structure in a substantially vertical alignment relative to the trailer frame.

When the lever is actuated, the first framework and the central roll are movable above the trailer frame. The wing rolls are movable by hand about the right and left axes of articulation and above the central roll with the rolling axes thereof aligned toward the forward direction. The agricultural roller thus folded is compact in size and easily towed on public roads.

In yet a further feature of the present invention, the right and left wing frameworks have respective outside ends relative to the intermediate structure, and pin connections on these outside ends. There is also provided a pair working chains mountable between the pin connections and the central framework for stiffening the right and left axes of articulation during use of the agricultural roller.

The trailer frame also has an elevated structure thereon comprising a pair of angle seats for supporting the right and left wing frameworks in their folded positions. The angle seats have holes therein and these holes have sizes and locations for mating with the pin connections on the outside ends of the right and left wing frameworks for retaining the right and left wing frameworks in their folded positions.

Still another feature of the agricultural roller of the present invention is that it is susceptible of a low cost of manufacture with regard to both materials and labor, and which accordingly is then susceptible of low price of sale to farm equipment retailers, thereby making it economically available to cereal growers.

BRIEF DESCRIPTION OF THE DRAWINGS

One embodiment of this invention is illustrated in the accompanying drawings, in which like numerals denote like parts throughout the several views, and in which:

FIG. 4 is a side view of the agricultural roller in a partly deployed configuration;

FIG. 5 is another side view of the agricultural roller in a fully deployed configuration, with one trailer wheel removed;

FIG. 6 is a rear view of the agricultural roller according to the present invention, in a deployed configuration;

FIG. 7 is a rear view of an agricultural roller of the prior art;

DETAILED DESCRIPTION OF THE PREFERRED EMBODIMENT

Figure 1:
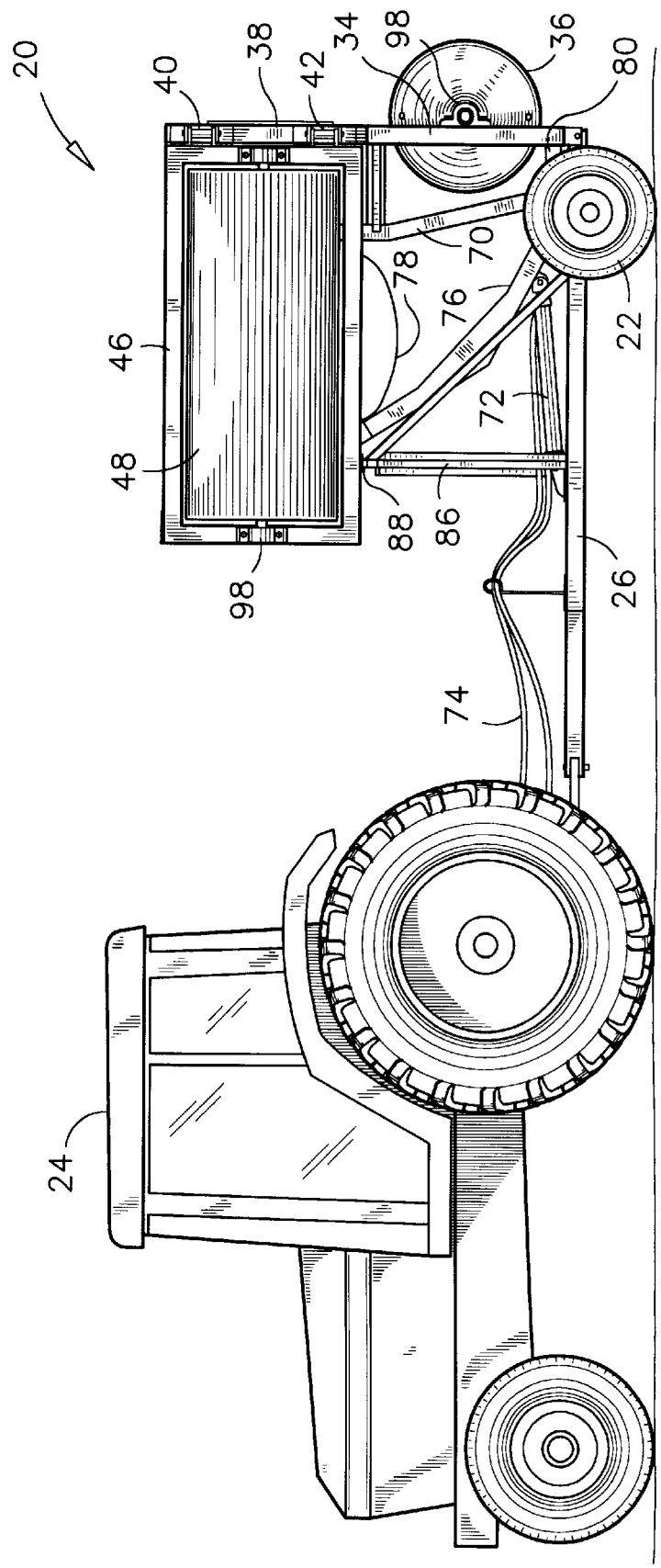
FIG. 1 is a side view of the agricultural roller according to the preferred embodiment in a folded roadworthy configuration and hitched to a farm tractor.

While this invention is susceptible of embodiment in many different forms, there is shown in the drawings and will be described in details herein a specific embodiment, with the understanding that the present disclosure is to be considered as an example of the principles of the invention and is not intended to limit the invention to the embodiment illustrated and described.

Figure 2:
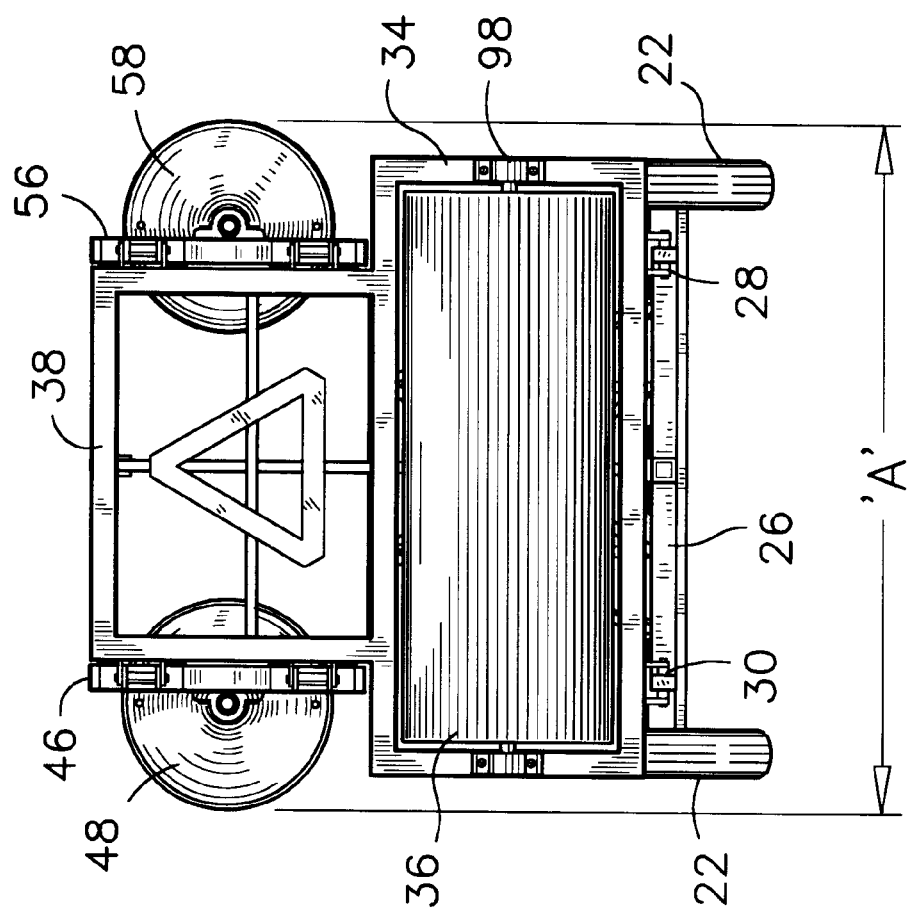
FIG. 2 is a rear view of the agricultural roller in a folded roadworthy configuration.

The foldable agricultural roller 20 according to the preferred embodiment is illustrated in a folded configuration in FIGS. 1 and 2. The agricultural roller 20 is foldable in a compact roadworthy configuration and is transportable on wheels 22 behind a farm tractor 24.

Although the agricultural roller has a deployed width of over 18 feet (5.5 m), as will be explained later, the machine is foldable in a compact form as illustrated in FIGS. 1 and 2 having a total width 'A' of 101¼ inches (2.57 m). The machine is thereby towable on public roads without requiring a special permit, and is easily parked inside a barn or equipment shed having standard garage door, during non-use periods.

Figure 3:
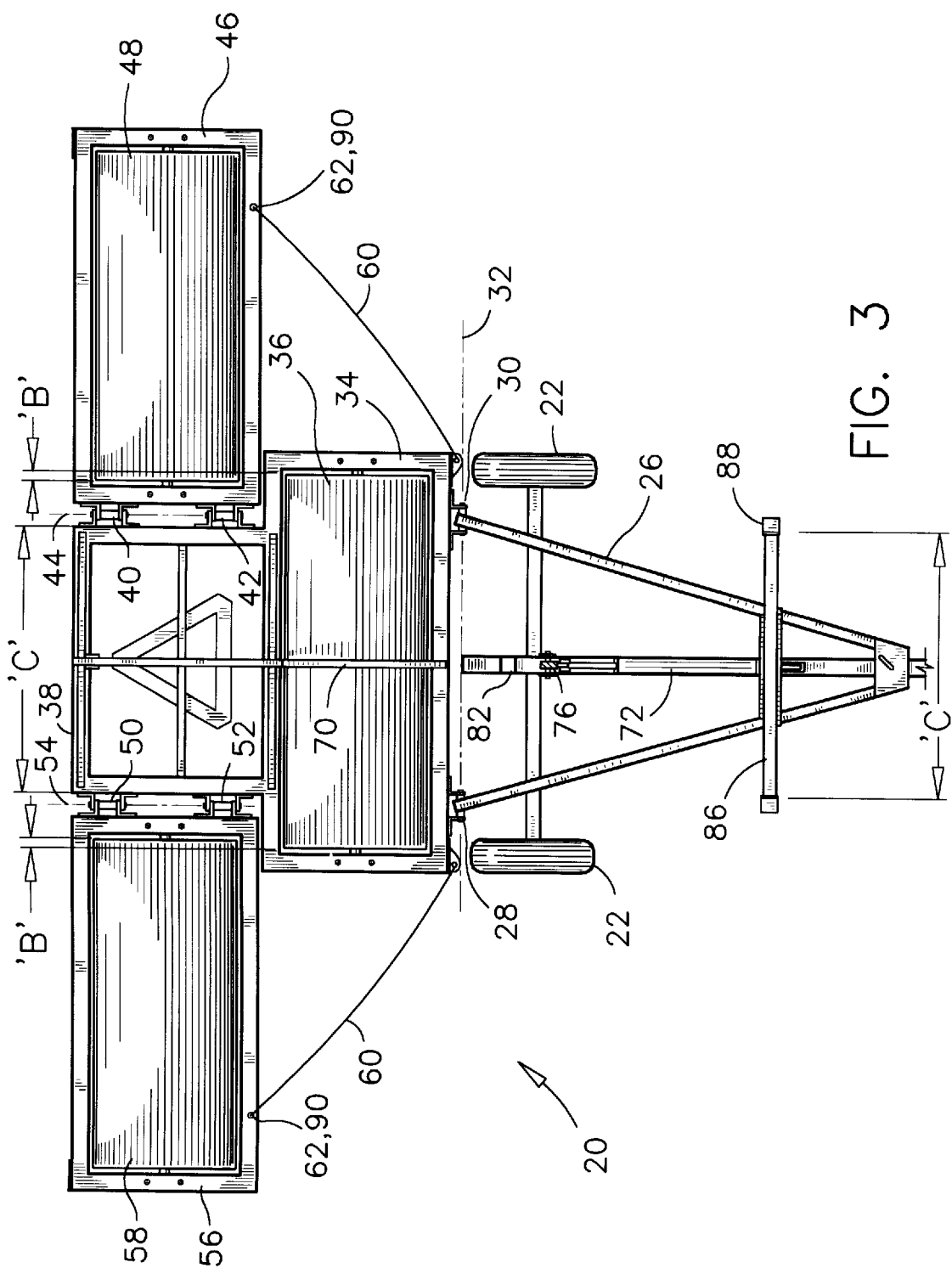
FIG. 3 is a top view of the agricultural roller in a deployed operable configuration.

Referring now particularly to FIG. 3, the agricultural roller according to the present invention is illustrated therein in a fully deployed operable mode having a triangular configuration. The agricultural roller 20 comprises a trailer frame 26 to which the pair of wheels 22 is attached. The trailer frame 26 has, immediately behind the wheels 22, a first pair of hinges 28,30 aligned with one another and defining a first axis of articulation 32 of the agricultural roller 20. For reference purposes, the first axis of articulation is aligned transversally relative to the direction of movement of the roller assembly 20.

The first pair of hinges 28,30 is connected to a central framework 34 enclosing a central roll 36. The central roll 36 has a preferred outside diameter of about 30 inches (76 cm) and a preferred overall length of about 78½ inches (2 m). The central roll is preferably fabricated from rolled steel sheet having a thickness of about 5/16 of an inch (8 mm).

On the rear side of the central framework 34, there is provided an intermediate structure 38 extending rearward, and in the same plane as the central framework 34. The intermediate structure 38 has on a right side thereof, when viewed from above, a second pair of hinges 40,42 aligned with one another and defining a second axis of articulation 44 of the agricultural roller 20. The second pair of hinges 40,42 are connected to a right wing framework 46 enclosing a right wing roll 48. The right wing roll 48 has a preferred outside diameter of about 30 inches (76 cm) and a preferred overall length of about 69 inches (1.75 m).

The intermediate structure 38 has on a left side thereof, a third pair of hinges 50,52 aligned with one another and defining a third axis of articulation 54 of the agricultural roller 20. The third pair of hinges 50,52 is connected to a left wing framework 56 enclosing a left wing roll 58. The left wing roll 58 also has a preferred outside diameter of about 30 inches (76 cm) and a preferred overall length of about 69 inches (1.75 m).

Both the right and left wing rolls 48,58 are preferably fabricated with rolled steel sheet having a thickness of ¼ inch (6 mm). Each wing roll 48,58, is preferably filled with at least 250 pounds of fluid, such as oil or water for example, such that their respective weight is slightly more than the weight of the central roll 36.

The width of the intermediate structure 38 is less than the overall width of the central framework 34 such that the right and left wing rolls 48,58 overlap the path of the central roll 36. The overlap dimension, as indicated by label 'B' in FIG. 3, is preferably about 2 inches (5 cm) on each side of the central roll 36, such that the edges of adjacent rolls remain in an overlapping relationship or at close proximity of one-another despite moderate articulation of the wing rolls.

During an operation of the agricultural roller 20 of the preferred embodiment, a first pair of cables or chains 60, hereinafter referred to as the working chains 60, is preferably attached to the forward corners of the central framework 34 and to two anchor points 62, one on each forward outside corner of the right and left wing frameworks 46,56 respectively. These working chains 60 do not hinder the up and down movements of the wing rolls. The working chains are recommended for security reasons, for preventing overstressing the hinges 40,42,50,52, when one of the wing rolls encounters an abrupt mound or a boulder for example.

Referring particularly to FIGS. 1, 4 and 5, the agricultural roller of the preferred embodiment further has a bridge structure 70 extending above the central framework 34 and above the intermediate structure 38. The three rolls are lifted up from an operating position to a stowed, roadworthy position, as illustrated in FIG. 1, by means of an hydraulic cylinder 72 connected to the trailer frame 26.

The hydraulic cylinder 72 is operable from the hydraulic power supply system 74 of the tractor. The hydraulic cylinder 72 is also connected to a lever 76 which is pivotally connected to the trailer frame 26 and which has a length longer than the height of the bridge structure 70.

The upper end of the lever 76 is connected to the rear end of the bridge structure 70 by means of a second cable or chain 78.

The bridge structure 70 further has a knee member 80 which is movable against a rest block 82 on a central member of the trailer frame 26 as illustrated in FIGS. 3 and 5. The knee member 80 is movable against the rest block 82, when the central framework 34 is being pulled upward and has reached a substantially vertical position as illustrated in FIG. 1.

When the rolls are being raised into a stowed position, a third pair of chains or cables 84 is preferably installed between the upper rear end of the bridge structure 70 and the outside rear end of the right and left wing frameworks 46,56 as illustrated in FIGS. 4 and 5, and in broken lines in FIG. 6. The purpose of the cables or chains 84 is to prevent the wing rolls 48,58 from tilting downward when the central framework 34 and the intermediate structure 38 are being lifted upwardly.

There is further provided on the trailer frame 26, an elevated support stand or structure 86 having a pair of angle seats 88 spaced apart a distance 'C' substantially similar to a width of the intermediate structure 38. Each angle seat 88 has a hole 89 therein for receiving a pin 90 on a respective anchor point 62, when the wing frameworks 46,56 are in their folded positions. The engagement of a pin 90 of an anchor point 62 into an angle seat 88 is better illustrated in FIG. 8.

A preferred method for lifting the rolls of the agricultural roller according to the preferred embodiment into a roadworthy position is described as follows. It will be appreciated that the deployment of the rolls from the stowed positions to their operating positions is effected by reversing the following procedure.

a) Installing a pair of cables or chains 84 between the upper rear end of the bridge structure 70 and the outside rear corners of the right and left wing frameworks 46,56;

b) Actuating the hydraulic cylinder 72 in a retracting mode, and lifting the rolls until the knee member 80 on the bridge structure 70, rests against the rest block 82, and the central framework 34 is aligned substantially vertically;

c) Removing the working chains 60 from both wing frameworks;

d) Turning the wing rolls 48,58 forwardly to engage the pin 90 of each anchor point 62 into the hole 89 in each angle seat 88;

e) Locking the pins 90 into the angle seats 88 by means of hitch clips or otherwise.

Referring now particularly to FIGS. 4 and 5, there is illustrated therein an important characteristic of the agricultural roller according to the preferred embodiment. The wheels 22 of the agricultural roller are mounted to the trailer frame 26 at a nominal distance 'D' under a first horizontal reference plane 96 defined by the trailer frame 26.

Similarly, the central roll 36 is mounted in a pair of pillow block bearings 98 with appropriate shims such that the rolling axis thereof is at the nominal distance 'D' from a median plane 100 defined by the outline of the central framework 34 and intermediate structure 38.

The diameter of the wheels 22 is preferably about 26 inches (66 cm). The diameter of the central roll is about 30 inches (76 cm). Thus, when the rolls of the agricultural roller 20 according to the preferred embodiment are lowered to the ground, the central roll 36 touches the ground surface before the wing rolls 48,58. The weight of the wing rolls 48,58 causes a levering action on the first axis of articulation 32, about the central roll 36, and causes the rear end of the trailer frame 26 and wheels 22 to lift off the ground by a distance 'E' of about 2 inches (5 cm). The weight of the wing rolls 48,58 also causes the trailer frame 26 to remain in the raised position during the operation of the agricultural roller.

This feature is particularly appreciable because there is no wheel to remove or jack to actuate to convert the agricultural roller 20 from a transportable position to an operable position. The transfer of weight of the machine between the wheels 22 and the rolls is done automatically when raising or lowering the rolls.

Another advantage of the agricultural roller 20 according to the preferred embodiment over an agricultural roller 110 of the prior art is illustrated in FIGS. 6 and 7. When the agricultural roller of the prior art 110 does not have a longitudinal axis of articulation between the central roll 112 and a side roll 114, and when the side roll 114 encounters a hard mound 116 or other similar irregularity in a field for example, the entire roll frequently tends to lift up as illustrated in FIG. 7. This has the adverse effect of leaving grooves 118 and ridges in the soil being rolled.

The agricultural roller 20 according to the preferred embodiment on the other hand, leaves a smooth transition surface between a mound 120 and a flat surface 122 as illustrated in FIG. 6. The articulation of the wing roll 58 about the axis 54 maintains the inside end of the wing roll at substantially a same level as the central roll 36.

Those skilled in the art will appreciate that a similar advantage is obtained when the one end 124 of the central roll 36 is on a higher level than one of the wing rolls 48 for example.

Figure 8:
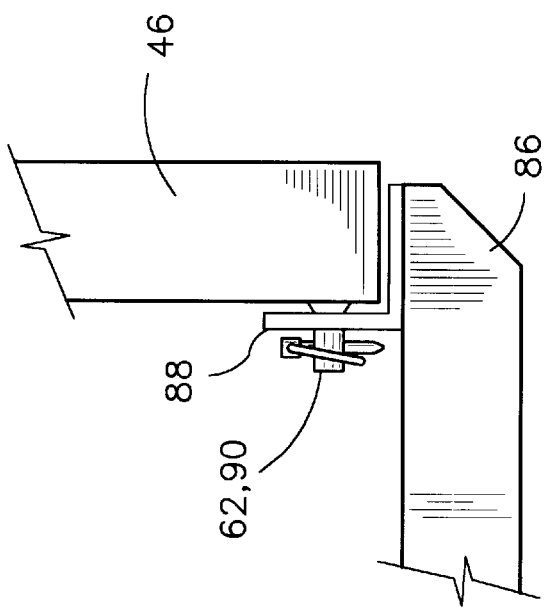
FIG. 8 is a partial front view of the elevated support structure and a wing framework in a stowed or folded configuration.

Referring now the FIG. 8 there is illustrated therein a partial front view of a connection of the anchor point 62 on a wing framework to the angle seat 88 on the elevated support stand 86 when one of the wing roll 46 is in a stowed position.

Figure 9:
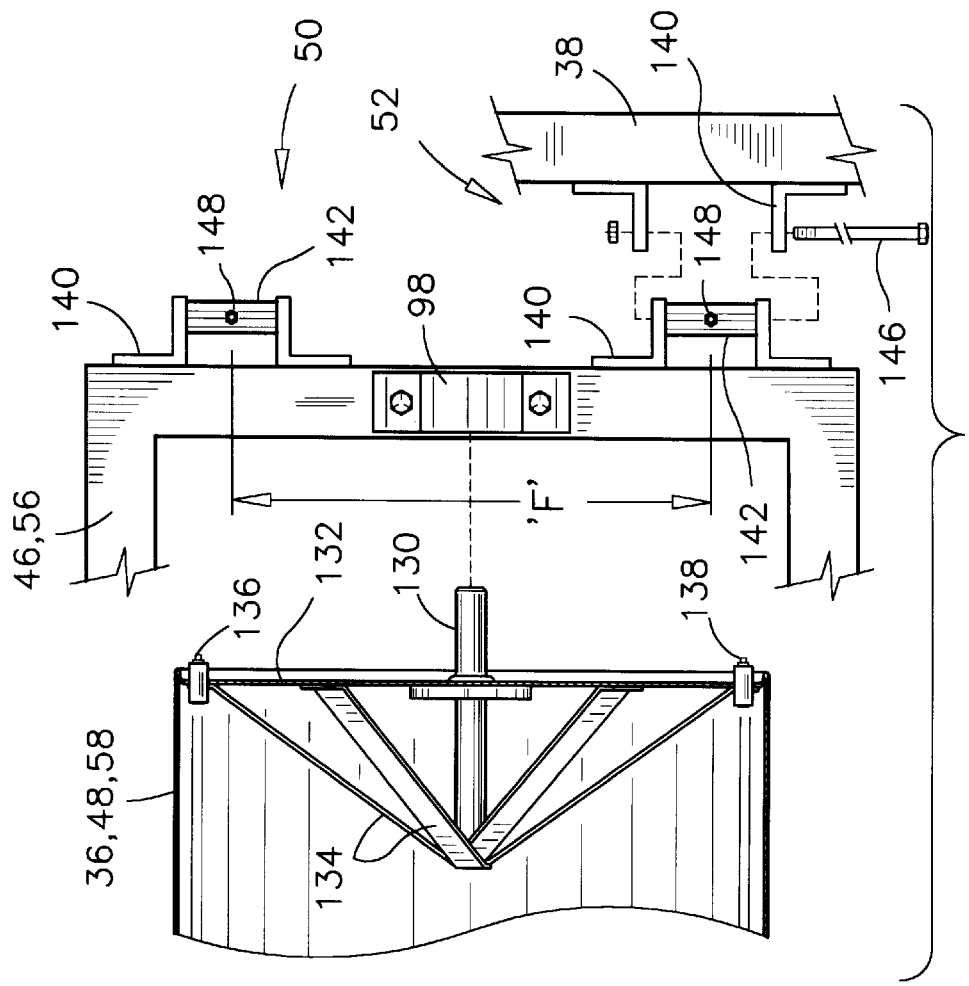
FIG. 9 is a partial bottom cross-section view of a wing roll and a partial exploded bottom view of a hinge assembly connecting a wing framework to the intermediate structure.

FIG. 9 illustrates various structural characteristics of the rolls 36,48,58 and of a wing framework 46,56. Firstly, each roll in the agricultural roller of the preferred embodiment has stub axles 130 mounted through a head plate 132 on each ends of the roll. The stub axles 130 of the central roll 36 are preferably 1¾ inches (45 mm) in diameter, and the axles on the wing rolls 48,58, are preferably 1½ inches (38 mm) in diameter. The stub axles 130 are mounted in pillow block bearings 98 of corresponding nominal sizes. These pillow block bearings 98 are affixed to a lower side of the respective framework 34,46,56.

Each stub axle 130 extends through the head plate 132 and inside the roll over a distance of at least 8–10 inches (20–25 cm). The inside end of the stub axle 130 is braced to the head plate by a plurality of flat bars 134 welded to both the inside end of the stub shaft 130 and to the inside circumference of the head plate 132.

One of the head plates 132 on each of wing rolls 48,58 has a fill opening 136, and a drain opening 138 for introducing the ballast liquid therein as previously mentioned.

Each of wing frameworks 46,56 is preferably fabricated with hollow structural steel members (HSS) of 3½ inches by 3½ inches by ¼ inch wall thickness (9 cm×9 cm×6 mm). The hinges 40,42 or 50,52 on a each wing framework 46,56 are preferable spaced apart a distance 'F' of at least about 24 inches (61 cm). Each of hinges 40,42,50,52 is preferably fabricated with angle sections 140 of 3½ inches by 3½ inches by ¼ inch thick (9 cm×9 cm×6 mm). One half of the hinge is made with a pair of angle sections 140 enclosing a hollow tube 142. The hollow tube 142 is machined to allow a sliding fit on a one-inch diameter (25 mm) hinge bolt 146. Each hollow tube 140 preferably has a grease fitting 148 in a central region thereof to periodically apply lubricant to the hinges and prevent wear. The hinges 28,30 along the first axis of articulation 32 are also manufactured in a same way as just described.

The agricultural roller 20 according to the preferred embodiment is thereby sturdy, easily movable on public roads, particularly smooth and silent in use, and produces uniformly compacted agricultural lands.

As to further manner of usage, operation and construction of the agricultural roller according to the preferred embodiment, the same should be apparent from the above description, and accordingly no further discussion relative to these aspects of the invention are provided.

While one embodiment of the present invention has been illustrated in the accompanying drawings and described hereinabove, it will be appreciated by those skilled in the art that various modifications, alternate constructions and equivalents may be employed without departing from the true spirit and scope of the invention. Therefore, the above description and the illustrations should not be construed as limiting the scope of the invention which is defined by the appended claims.

I claim:

1. An agricultural roller for working agricultural lands, comprising:

a trailer frame having a forward end, a rear end, a hitch mounted on said forward end and a pair of spaced apart wheels mounted thereto near said rear end, said trailer frame defining a horizontal plane, and said forward end defining a forward direction relative to said rear end; said wheels having a first diameter and being mounted under said trailer frame with a common wheel axis thereof at a nominal distance below said horizontal plane;

a first framework having a first hinge means connected to said rear end and defining a first axis of articulation between said trailer frame and said first framework; said first framework having a rectangular outline, a lower side, a median plane along said outline and said first axis of articulation being oriented transversally relative to said forward direction;

a first roll rotatively mounted in said first framework; said first roll having a second diameter and being oriented for rotation toward said forward direction and being mounted to said first framework with a rolling axis thereof at said nominal distance from said median plane on said lower side; said second diameter being larger than said first diameter;

an intermediate structure rigidly connected to said first framework and extending rearward said first framework within said median plane, and a pair of wing frameworks connected to said intermediate structure; and a pair of wing rolls each having a substantial weight, rotatively mounted in said wing frameworks, orientational for rotation toward said forward direction and defining with said first roll a triangular formation pointing in said forward direction;

such that when said first framework is moved about said first axis of articulation, and said median plane is made to align with said horizontal plane of said trailer frame, said wheels are raisable off the ground.

2. The agricultural roller as claimed in claim 1, wherein said intermediate structure has spaced-apart right and left sides relative to said forward direction, said first roll has right and left ends, and said pair of wing frameworks comprises:

a right wing framework having a right hinge means movably connected to said right side of said intermediate structure and defining a right axis of articulation between said right wing framework and said intermediate structure, said right axis of articulation being aligned with said median plane, oriented at right angle with said first axis of articulation, and positioned near said right end of said first roll; and a left wing framework having a left hinge means movably connected to said left side of said intermediate structure and defining a left axis of articulation between said left wing framework and said intermediate structure, said left axis of articulation being aligned with said median plane, oriented at right angle with said first axis of articulation, and positioned near said left end of said first roll; and said pair of wing rolls comprises:

a right wing roll rotatively mounted in said right wing framework, and a left wing roll rotatively mounted in said left wing framework.

3. The agricultural roller as claimed in claim 2, further comprising a bridge structure extending over said median plane and chains connected to said bridge structure and to said right and left wing frameworks for selectively retaining said right and left wing frameworks in said median plane.

4. The agricultural roller as claimed in claim 1 wherein said first diameter is about 26 inches and said second diameter is about 30 inches.

5. The agricultural roller as claimed in claim 1, wherein each said wing roll is heavier than said first roll.

* * * * *